(12) United States Patent
Zimmet

(10) Patent No.: US 7,172,407 B2
(45) Date of Patent: Feb. 6, 2007

(54) INJECTION UNIT FOR INJECTION MOLDING MACHINES WITH CONTINUOUSLY OPERATING PLASTICIZING UNIT

(75) Inventor: Rainer Zimmet, Neckarwestheim (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 221 days.

(21) Appl. No.: 10/272,099

(22) Filed: Oct. 15, 2002

(65) Prior Publication Data

US 2003/0038406 A1    Feb. 27, 2003

Related U.S. Application Data

(63) Continuation of application No. PCT/EP01/04249, filed on Apr. 12, 2001.

(30) Foreign Application Priority Data

Apr. 14, 2000   (DE)   ................. 100 18 542

(51) Int. Cl.
  *B29C 45/53*   (2006.01)
(52) U.S. Cl. .............. 425/557; 425/558; 425/559; 425/561
(58) Field of Classification Search ............. 425/557, 425/558, 559, 561; 336/79, 80, 81
  See application file for complete search history.

(56) References Cited

U.S. PATENT DOCUMENTS

| | | | |
|---|---|---|---|
| 3,020,591 A * | 2/1962 | Breher et al. ............... 425/550 |
| 3,245,115 A * | 4/1966 | Ecklund ..................... 92/110 |
| 3,843,757 A * | 10/1974 | Ehrenfreund et al. ......... 264/53 |
| 4,557,683 A * | 12/1985 | Meeker et al. ............. 425/147 |
| 5,000,900 A * | 3/1991 | Baumgartner ........... 264/211.23 |
| 5,032,073 A * | 7/1991 | Moyer, III ................. 425/208 |
| 5,110,279 A * | 5/1992 | Amemiya et al. .......... 425/208 |
| 5,380,186 A * | 1/1995 | Hettinga et al. ............ 425/557 |
| 5,403,178 A * | 4/1995 | Steger ...................... 425/557 |
| 5,804,230 A * | 9/1998 | Hasegawa et al. .......... 425/557 |
| 5,902,529 A * | 5/1999 | Ishikawa et al. ............ 264/51 |
| 6,109,910 A * | 8/2000 | Sekido ..................... 425/561 |
| 6,241,932 B1 * | 6/2001 | Choi et al. .............. 264/328.8 |
| 6,403,010 B1 | 6/2002 | Ganz et al. .............. 264/328.1 |
| 6,609,818 B1 * | 8/2003 | Fogarty ..................... 366/81 |

FOREIGN PATENT DOCUMENTS

| | | |
|---|---|---|
| AT | 403 776 | 5/1998 |
| DE | 11 05 153 B | 4/1961 |
| DE | 31 21 428 | 2/1982 |
| DE | 43 04 489 | 9/1993 |

(Continued)

*Primary Examiner*—Yogendra N. Gupta
*Assistant Examiner*—Emmanuel S. Luk
(74) *Attorney, Agent, or Firm*—Henry M. Feiereisen

(57) ABSTRACT

An injection unit for an injection molding machine includes a plasticizing unit in the form of an extruder, a plunger-type injection device, which can be connected to the injection molding machine by an injection nozzle. The plunger-type injection device defines an injection space. The extruder has a forward portion which is connected to the injection space by a melt through channel in which a shutoff valve is disposed. The extruder is operated continuously and includes one or more plasticizing screws, wherein the extruder is configured in such a way that the backup length can expand backwards into the extruder, when the shutoff valve is closed.

14 Claims, 5 Drawing Sheets

FOREIGN PATENT DOCUMENTS

| | | |
|---|---|---|
| DE | 195 05 984 | 8/1996 |
| DE | 197 20 630 | 11/1998 |
| FR | 1 339 308 A | 1/1964 |
| FR | 71 31 421 | 4/1973 |
| GB | 861 911 A | 3/1961 |
| GB | 11 66 472 | 10/1969 |
| GB | 1 172 707 A | 12/1969 |
| GB | 11 72 707 | 12/1969 |
| WO | WO 86/06321 | 11/1986 |

* cited by examiner

INJECTION UNIT FOR INJECTION MOLDING MACHINES WITH CONTINUOUSLY OPERATING PLASTICIZING UNIT

CROSS-REFERENCES TO RELATED APPLICATIONS

This application is a continuation of prior filed copending PCT International application no. PCT/EP01/04249, filed Apr. 12, 2001, which was not published in English and which designated the United States and on which priority is claimed under 35 U.S.C. §120, the disclosure of which is hereby incorporated by reference.

This application claims the priority of German Patent Application Serial No. 100 18 542.8, filed Apr. 14, 2000, pursuant to 35 U.S.C. 119(a)–(d), the disclosure of which is incorporated herein by reference.

BACKGROUND OF THE INVENTION

The present invention relates, in general, to an injection unit for injection molding machines with continuously operating plasticizing unit.

Injection molding machines are known in which a reciprocating screw equipped with a back flow valve implements the plastification of the plastic granulate and generates the injection pressure. Other approaches involve an operational division between a screw plasticizing unit, on the one hand, and a plunger-type injection unit, on the other hand. Constructions of this type have the advantage that a screw plasticizing unit can operate at optimum plasticizing capacities. Moreover, the use of several plunger-type injection units, fed from a screw plasticizing unit, permits the screw plasticizing unit to be continuously operated because melt can be fed alternatingly to the various, normally two, plunger-type injection units. A continuous operation of the plasticizing unit is advantageous because not only is the melt more homogenous, but the plasticizing capacity can be increased since shutdown periods are eliminated or a smaller screw can be utilized while maintaining a same capability. Furthermore, wear is significantly reduced, in particular when large screws are involved, because there is no need for a constant re-starting (absence of adhesive wear during start-up). Also the motor and the transmission are subject to less stress in view of the even load.

A screw plasticizing unit in combination with plunger-type injection units can also be used as compounder for mixing varied components. As the plasticizing screw is not moved back and forth, solid and liquid additives can always be fed at the same location relative to the screw. The same is true, when producing foamed products, because foaming agent can also be added always at the same spot. The continuous operation prevents an undesired pressure drop of the foaming agent, as has been experienced with injection molding machines with reciprocating screws during shutdown period.

An injection molding machine with a separate plasticizing unit, on the one hand, and several plunger-type injection devices, on the other hand, suffers however the drawback that the plurality of existing plunger-type injection devices require significant space for installation. Moreover, long melt lines that need to be heated, and respective pressure losses have to be accepted. Since, moreover, the plasticizing unit and the plunger-type injection devices are placed above or next to one another, the heated melt lines result in a heat expansion orthogonally to the longitudinal machine axis. The hereby resultant length changes of the melt lines pose significant problems. Further, the alternating feeding of the plunger-type injection units require reverse valves. Typically, also the purging quality is poor because the cylinder spaces of the plunger-type injection units cannot be filled and emptied according to the principal of a continuous melt stream flowing in only one direction (first-in, first-out).

German Pat. No. DE 195 05 984 A1 discloses an injection molding machine with separate and continuously operating plasticizing unit and two plunger-type injection devices, but with unidirectional melt flow (first-in, first-out). This publication illustrates an injection molding machine in which a screw plasticizing unit, comprised of two plasticizing screws running in a same direction, is connected downstream to two plunger-type injection devices which, controlled by reverse valves, can be fed alternatingly with melt. A unidirectional melt flow is realized in this injection molding machine by supplying each plunger-type injection device through conduction of melt via telescopically movable melt lines into the respective plunger bottom of the plunger-type injection devices. This significantly increases, however, the length of the melt line.

British Pat. No. GB 1,172,707 discloses an injection unit in the form of a hollow injection plunger with accommodates therein a plasticizing screw which is stationary relative to a machine frame, so as to create a reserve chamber for receiving melt anteriorly of the plasticizing screw as the injection plunger advances, so that the plasticizing screw can be continuously operated and the reserve chamber is filled with melt during the injection phase and afterpressure phase. When the injection plunger is moved back, melt is expelled from the reserve chamber and flows via a back flow valve into the injection space in front of the injection plunger. A drawback of this construction is the fact that the plasticizing screw is unable to fill melt into the reserve chamber, formed briefly during injection, in view of the rapid movement of the injection plunger. As a consequence, this reserve chamber experiences a sudden pressure drop and bubbles form in the melt, resulting in defective injection-molded formed parts. Acknowledging this drawback, British Pat. No. GB 1,172,707 proposes to provide a longitudinal displacement of the plasticizing screw in the injection plunger, so that the volume of the reserve chamber in front of the plasticizing screw is variable and can be so controlled as to constantly keep the reserve chamber under pressure so that no bubble formation can be encountered.

It would be desirable and advantageous to provide an improved injection unit for injection molding machines to obviate prior art shortcomings and to allow a continuous operation of the plasticizing unit, in particular when the production of thin-walled formed parts is involved, even though the plasticizing screw is in fixed relationship with respect to the injection plunger.

SUMMARY OF THE INVENTION

According to one aspect of the present invention, an injection unit for an injection molding machine, includes a plasticizing unit; a plunger-type injection device, which has a housing, an injection nozzle supported by the housing for interaction with an injection mold, and an injection plunger supported for movement in a telescopic manner in the housing and defining with the housing anteriorly of the injection plunger an injection space, wherein the injection plunger has a forward end which includes a closeable melt through channel for feeding the injection space with melt, wherein a continuously operated extruder is provided as injection plunger and for plasticizing, and has at least one plasticizing screw, wherein the plasticizing screw is stationary in a longitudinal machine axis with respect to a screw and extruder housing, and wherein the extruder is so configured that a backup length towards the rear can enlarge into the extruder, when the melt through channel is closed.

The present invention resolves prior art problems by combining an injection plunger with an extruder having one or more plasticizing screws, whereby the extruder is so configured that the backup length $R_L$ towards the rear can be expanded into the extruder, when a shutoff valve in the melt through channel is closed, so that the extruder itself offers a sufficiently large buffer area for "temporarily storing" melt during the injection phase and afterpressure phase. This is especially true during the production of thinwalled formed parts, when the cooling period is relatively short, so that the extruder can be operated continuously and melt can be buffered in the free space between the screws.

According to another feature of the present invention, the injection plunger may be made of two parts, defining a rearward part, which is formed by the extruder, and a forward part, which is formed by a transition piece which is connected to the extruder and movable in the housing. The injection plunger may also be of single-piece construction with a leading part movable in the housing and a trailing part configured as a barrel for accommodating the plasticizing screw.

According to another feature of the present invention, the shutout valve may be an actively controllable shutoff valve.

According to another feature of the present invention, the extruder may be a single screw extruder including a barrel, which is defined by a cylinder diameter and accommodates the plasticizing screw, which is defined by an outer diameter, wherein in the area of the backup length the outer diameter of the plasticizing screw may be reduced, and/or the cylinder diameter of the barrel may be increased, and/or holes in screw lands may be provided.

According to another feature of the present invention, the extruder may be a twin screw extruder with two plasticizing screws which rotate in a same direction. This configuration provides sufficient free space between the screws for backup of melt so that the backup length can easily expand backwards.

According to another feature of the present invention, the plasticizing screws may be arranged tangent to one another and thus do not mesh.

According to another aspect of the present invention, a method for operating an injection molding machine of a type having an injection plunger for pushing melt from an injection space, situated anteriorly of an injection plunger into an injection mold, includes the step of continuously operating an extruder, which is stationary in a longitudinal machine axis with respect to a screw and extruder housing, to feed melt into an injection space anteriorly of an injection plunger.

Suitably, the melt channel during is closed during the injection phase and/or afterpressure phase.

According to another feature of the present invention, the plasticizing screw is continuously operated by a rotary drive to at reduced speed during the injection phase and/or afterpressure phase.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
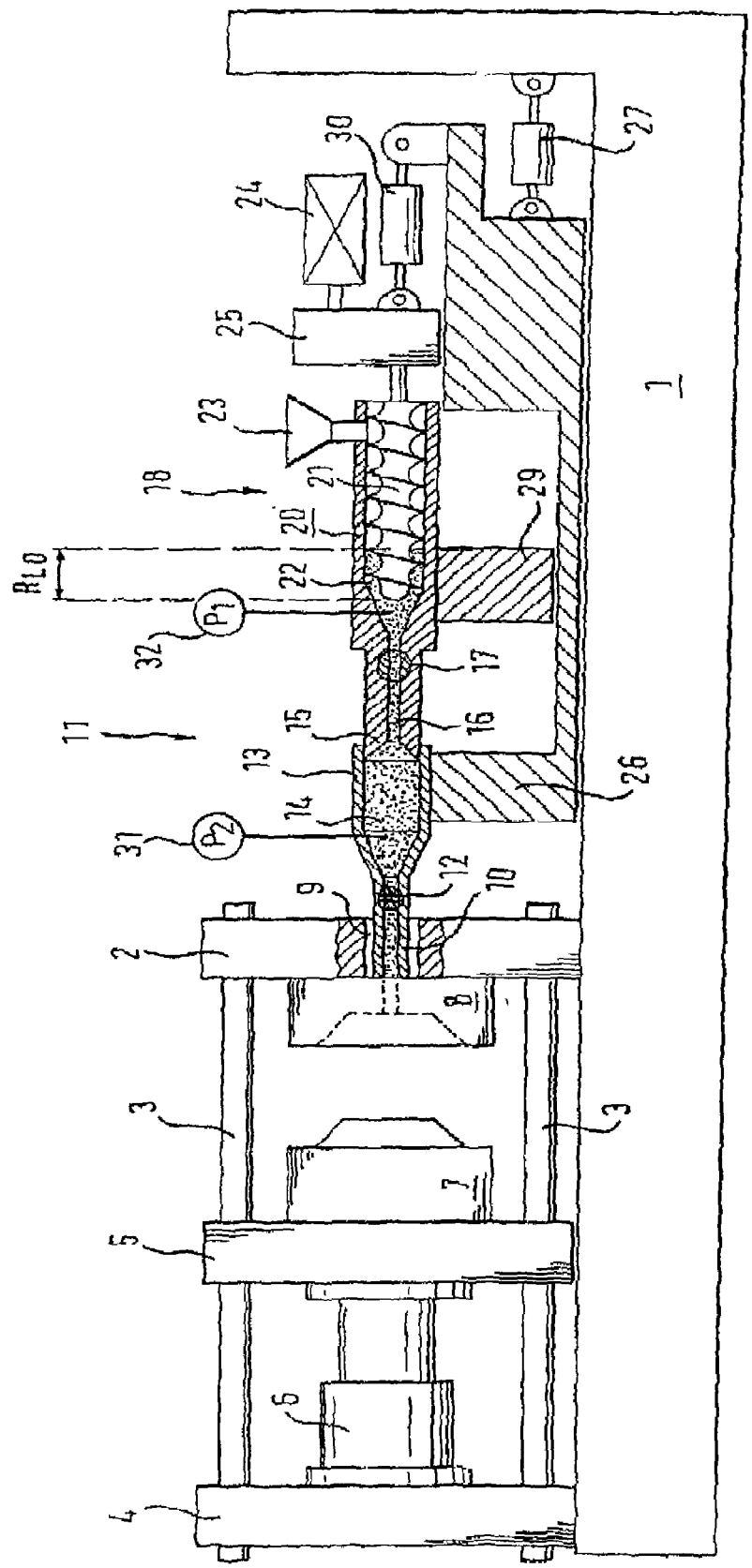
FIG. 1 is a sectional side view of one embodiment of an injection molding machine according to the present invention in a position before injection of melt into an injection mold.

Throughout all the Figures, same or corresponding elements are generally indicated by same reference numerals.

Turning now to the drawing, and in particular to FIG. 1, there is shown a sectional side view of one embodiment of an injection molding machine according to the present invention. This is one of two applications both filed on the same day. Both applications deal with related inventions. They are commonly owned and have the same inventive entity. Both applications are unique, but incorporate the other by reference. Accordingly, the following U.S. patent application is hereby expressly incorporated by reference: "Injection Unit for Injection Molding Machines with Continuously Operating Plasticizing Unit". The injection molding machine includes a machine frame 1 for attachment of a fixed mold mounting plate 2 which is connected by tie and guide bars 3 with a support plate 4. The tie and guide bars 3 traverse a moving mold mounting plate 5 which is movably supported on the machine frame 1. A hydraulic clamping mechanism 6 is disposed between the support plate 4 and the moving mold mounting plate 5. The fixed mold mounting plate 2 supports a mold half 8 defining a cavity, and the moving mold mounting plate 5 supports a mold half 7. Disposed on the side of the fixed mold mounting pate 2, facing away from the molded half 8, is a bore 9 for insertion and placement of an injection nozzle 10 of a plunger-type injection unit 11.

The plunger-type injection unit 11 has an outer housing 13, which supports the injection nozzle 10 and a shutoff valve 12 and which encloses an injection space 14 receiving melt being injected and accommodating the injection plunger 15 for telescopic movement relative to the housing 13. Provided in the interior of the injection plunger 15 is a melt through channel 16 which can be closed and cleared by an actively controllable shutoff valve 17. The injection plunger 15 has a rearward part in the form of a hollow-cylindrical portion which forms a screw and extruder barrel 20 of the plasticizing unit 18, whereby the melt through channel 16 connects the injection space 14 with of the interior of the barrel 20. Accommodated in the barrel 20 are two plasticizing screws 21 (only one is visible in the drawing) which rotate in a same direction and form a twin screw extruder. The plasticizing screws 21 are stationary in axial direction (longitudinal machine axis) with respect to the barrel 20. The melt through channel 16 connects the injection space 14 with a screw anterior space 22 of the barrel 20. Disposed in the rear area of the barrel 20 is a feed hopper 23 for supply of plastic material into the barrel 20, a rotary drive 24 for operating the two plasticizing screws 21 as well as a transmission 25. The surface of the injection plunger 15, confronting the injection space 14, as well as the screw anterior space 22 may have a concave configuration, as shown in FIG. 1, in order to facilitate a purging of the injection molding machine during a change of material or paint.

The outer housing 13 is mounted on a stand 26 which is movably supported upon the machine frame 1 and can be moved to and away from the fixed mold mounting plate 2 by a first hydraulic adjustment device 27. The injection plunger 15 may be provided, optionally with a bottom part 29, for support and guidance upon the stand 26. A second hydraulic adjustment device 30 allows a telescopic movement of the entire plasticizing unit 18 in the outer housing 13. Finally, the injection space 14 and the screw anterior space 22 are provided with pressure pickups 31 and 32, respectively, to monitor pressure P1 in the screw anterior space 32 and pressure P2 in the injection space 14. In addition, temperature sensors (not shown) may, optionally, be provided.

Figure 3:
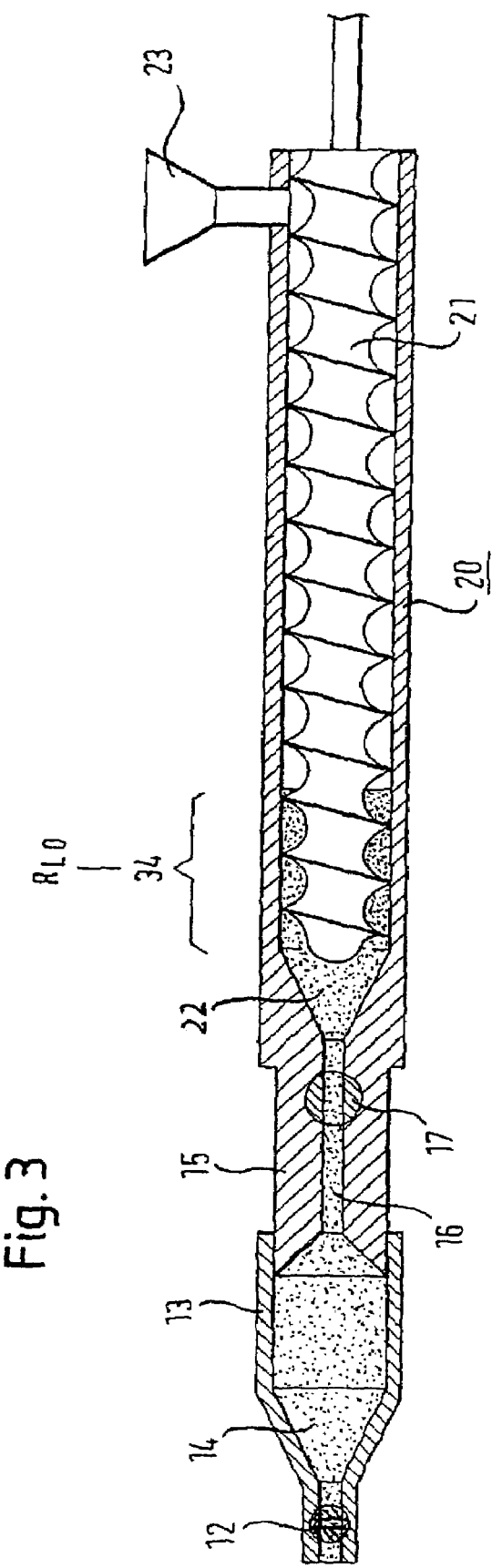
FIG. 3 is a cutaway view of an injection unit of the injection molding machine of FIG. 1 in the position before injection of melt.

During operation of the injection molding machine, the plasticizing unit 18 is continuously operated and the injection space 14 is supplied with melt while the shutoff valve 17 is open. FIGS. 1 and 3 show the situation prior to injection, in which the injection plunger 2 and the twin screw extruder 20, 21 assume their retracted position, whereby reference character $R_{L0}$ denotes the initial backup length (see also reference numeral 34 in FIG. 3). For ease of illustration, FIG. 3 (as well as FIGS. 4 and 5) show only the area of homogenous melt, while the plastic granulate in the inlet and melting region toward the feed hopper 23 is not illustrated in detail.

Figure 4:
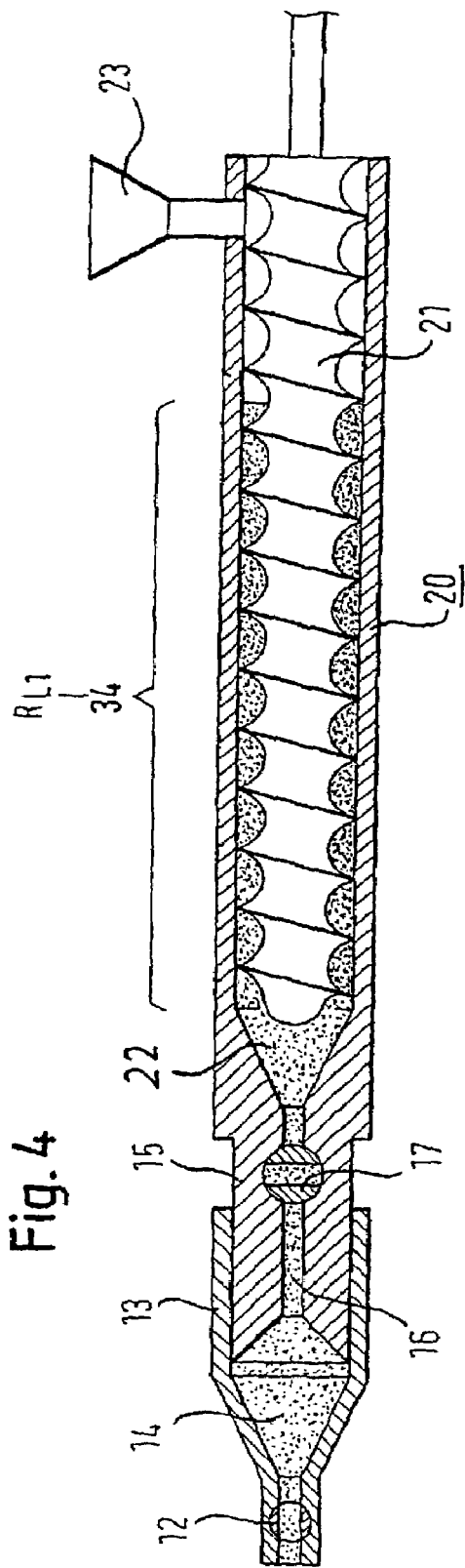
FIG. 4 is a cutaway view of the injection unit of the injection molding machine of FIG. 2 in the position after injection of melt.

When the injection space 14 is filled, the shutoff valve 17 in the melt through channel 16 is closed, as illustrated in FIG. 4, while the shutoff valve 12 in front of the injection nozzle 10 is opened. The injection stroke of the injection plunger 15 can now be initiated by means of the hydraulic adjustment device 28 to fill the cavity between the closed mold halves 7, 8 with melt.

Figure 2:
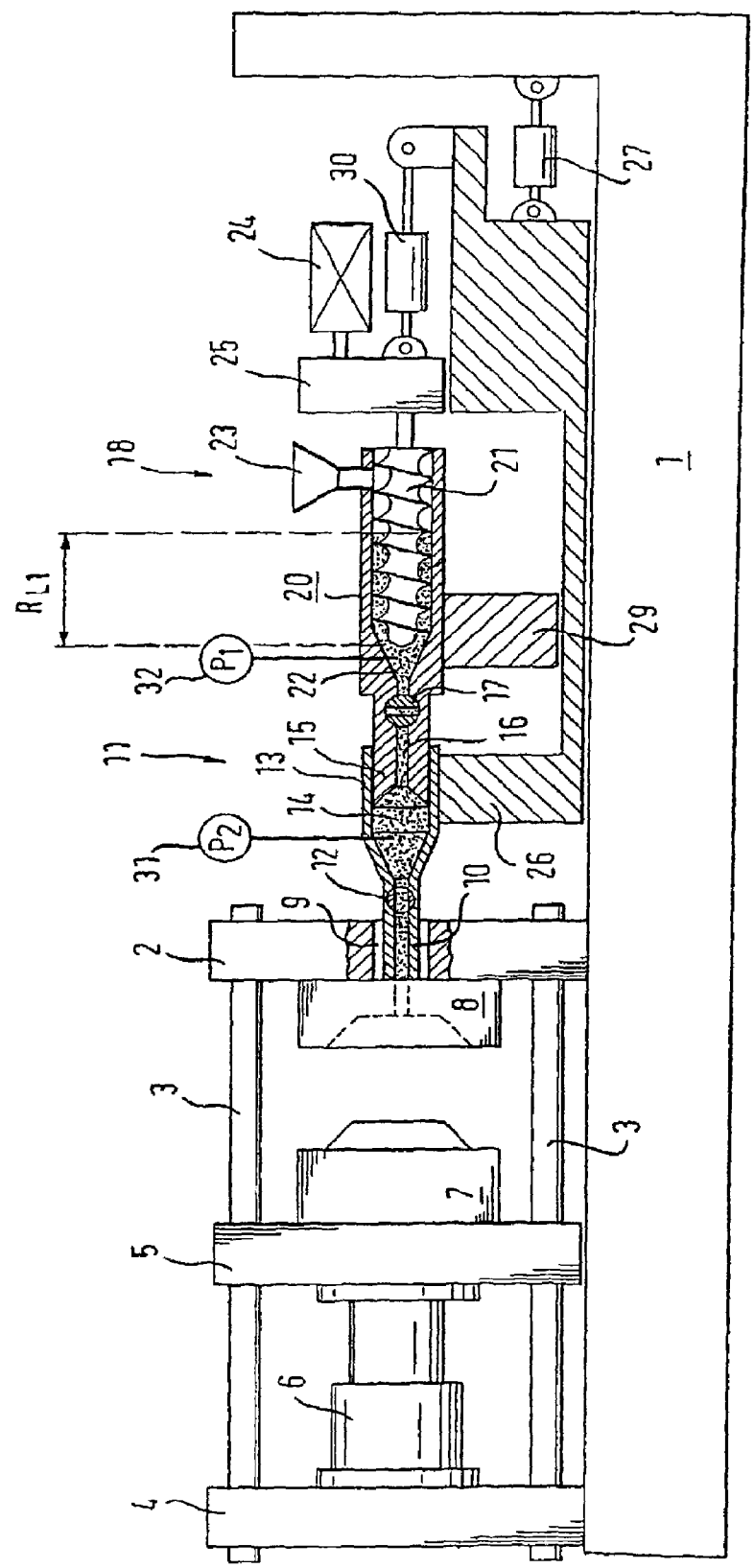
FIG. 2 is a sectional side view of the injection molding machine in a position after injection of melt into the injection mold.

FIGS. 2 and 4 show the situation at the conclusion of the injection stroke. The injection plunger 15 and the twin screw extruder 20, 21 assume their forwardmost position in the outer housing 13 and the injection space 14 has its minimum volume.

Next, the shutoff valve 12 in front of the injection nozzle 10 is closed, while the shutoff valve 17 in the melt through channel 16 is opened. As a consequence, the injection plunger 15 and the twin screw extruder 20, 21 are moved backwards.

As the plasticizing screw 21 rotates uninterruptedly and material is fed via the feed hopper 23, melt is continuously produced. The plasticizing unit 18 may continue to run during the injection stroke and during the dwell time of the injection-molded parts in the mold because during this time, when the shutoff valve 17 is closed, pressure P1, which builds up in the screw anterior space 22 in the twin screw extruder 20,21, can propagate to the rear and a fill degree of 1 can be generated little by little in the screw threads. The backup length increases from a value $R_{L0}$ to a value $R_{L1}$. The continuous operation of the plasticizing unit 18 is assured, especially when thinwalled form parts or short cycle times are involved, because there is not enough time for an excessive pressure buildup P1 in the screw anterior space 22 and melt can be buffered in this brief period in the region 34, as shown in FIG. 4. Melt is discharged rapidly by the injection plunger 15, moving backwards between the injection strokes, through the melt through channel 16, which is preferably kept short, out of the screw anterior space 22 and the region 34 of the plasticizing screws 21. A twin screw extruder with two plasticizing screws 21, rotating in a same direction, has between the plasticizing screws sufficient free space (no closed screw threads), which enables a sufficient enlargement of the backup length from $R_{L0}$ to $R_{L1}$ and thus provides for a large enough buffer region 34. Hereby, the pressure P1, building up in the screw anterior space 22, drops normally linearly from the screw anterior space 22 backwards to the free space between the plasticizing screws.

Figure 6:
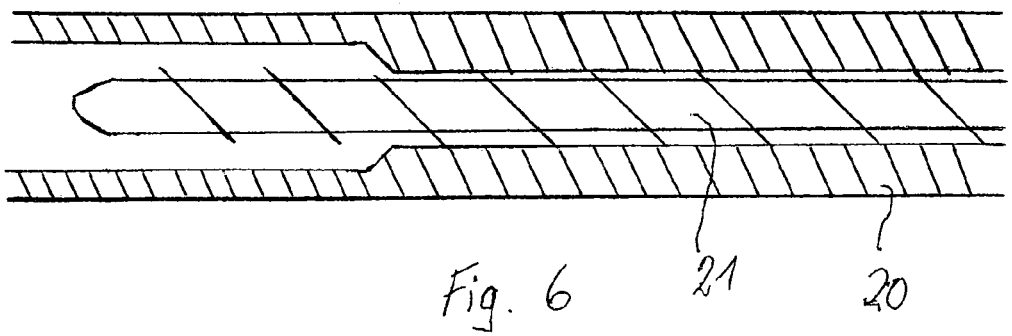
FIG. 6 is a fragmentary sectional view of a single-screw extruder having a barrel with varying cylinder diameter.
Figure 7:
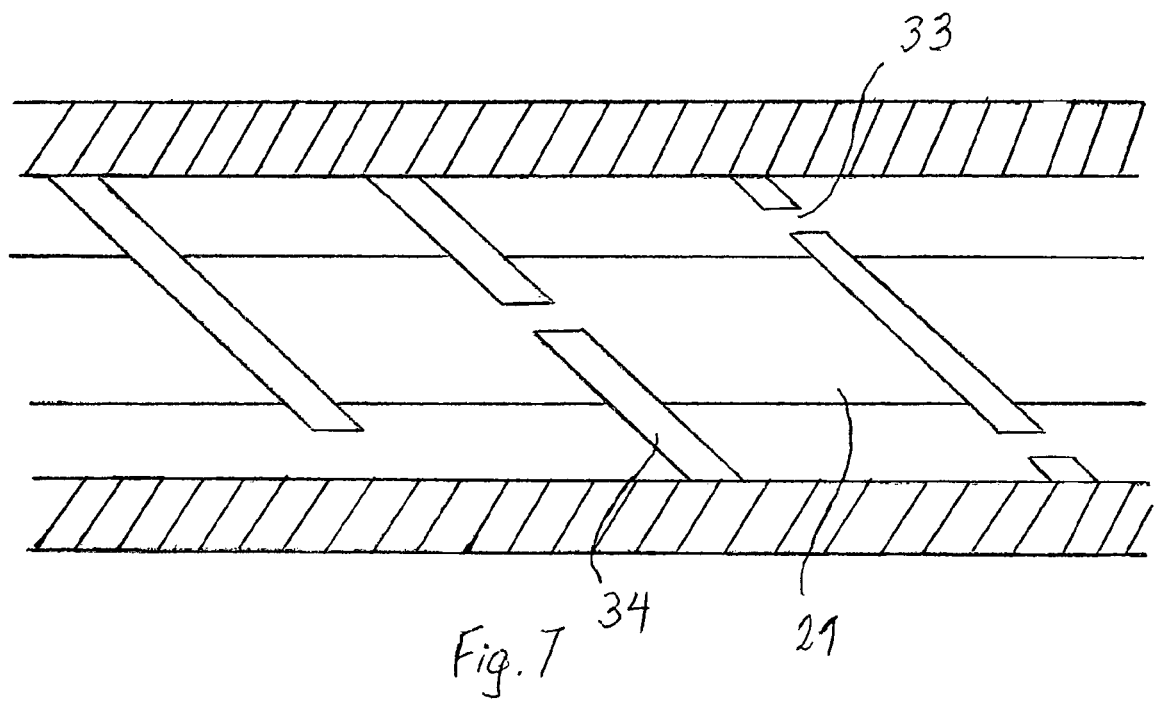
FIG. 7 is a fragmentary sectional view of a single-screw extruder having a screw with holes in screw lands.
Figure 8:
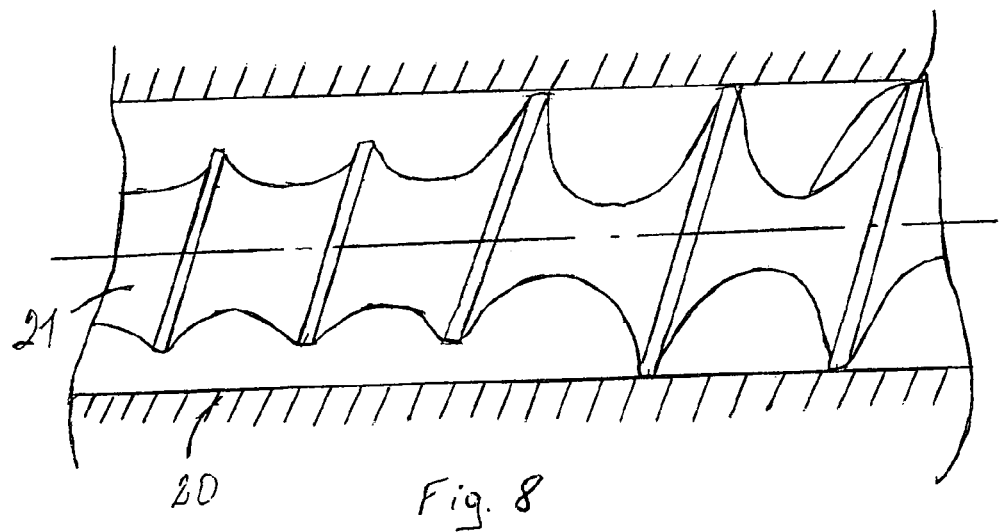
FIG. 8 is a fragmentary sectional view of a single-screw extruder having a screw with different cross sections.

Of course, this configuration of the afore-described twin screw extruder with plasticizing screws rotating in same direction is described by way of example only, and other configurations which generally follow the concepts outlined here are considered to be covered by this disclosure. For example, the plasticizing unit 18 may be configured as a single screw extruder whereby in the area of the backup length the outer screw diameter of the plasticizing screw 21 may be reduced, as shown in FIG. 8, and/or the cylinder diameter of the barrel 20 may be increased, as shown in FIG. 6, and/or arrangement of holes 11 in screw lands 34 may be provided, as shown in FIG. 7. Another variation involves a construction of the plasticizing unit 18 in the form of a twin screw extruder with the two plasticizing screws arranged tangent to one another and thus do not mesh. The use of an actively controllable shutoff valve 17 is suitable for processing melts containing long fibers and natural fibers because risk of damage to the fibers can be experienced with common back flow valves as a consequence of a flow through narrow and wound flow channels.

Figure 5:
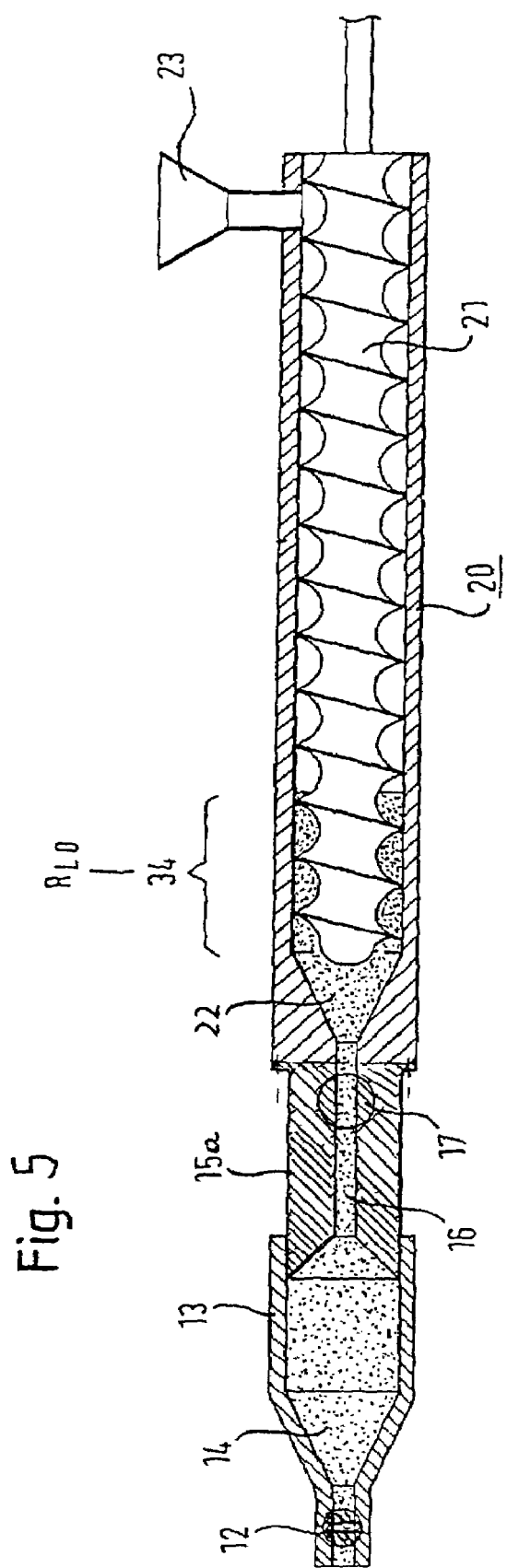
FIG. 5 is a cutaway view of a modified injection unit of the injection molding machine in the position before injection of melt.

Referring now to FIG. 5, there is shown a cutaway view of a modified injection unit of the injection molding machine similar to FIG. 3, with the difference residing in the configuration of the injection plunger 15. As shown in FIG. 5, the injection plunger 15 is made of two parts, defining a rearward part, which is formed by the extruder 20, and a forward part, which is formed by a transition piece 15a which is connectable to the rear extruder 20 and movable in the housing 13.

Although not shown in detail, the extruder 20 is configured in such a manner that melt can backup in the extruder 10 to a backup length $R_{L1}$, when the shutoff valve 17 is closed, as shown in FIG. 4. Hereby, the plasticizing screw 21 can be received within the barrel 20 in a way that its crest is spaced at a distance from the enclosing inside wall of the barrel 20. The spacing between the screw crest and the barrel wall may be realized by reducing the outer diameter of the plasticizing screw 21, or by increasing the cylinder diameter of the barrel 20, or by arranging holes in screw lands.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A combined plasticizing and injection unit for an injection molding machine, comprising:
   a housing;
   an injection nozzle supported by the housing for interaction with an injection mold;
   an extruder constructed for continuously producing melt and for forcing melt into the injection mold via the injection nozzle, said extruder including an injection plunger supported for movement in a telescopic manner in the housing and defining with the housing anteriorly of the injection plunger an injection space for supply of melt to the injection nozzle, said injection plunger configured to define a barrel and including a melt through channel for feeding the injection space with melt, said extruder including at least one plasticizing screw which is received in the barrel and continuously produces melt and which has an outer thread, and;
   a valve disposed in the melt through channel and controllable to close the melt through channel
   wherein the extruder has a passageway to enable melt to backup towards the rear via the outer thread of the plasticizing screw, when the melt through channel is closed by the valve and melt is injected into the injection mold by the injection plunger of the extruder.

2. The plasticizing and injection unit of claim 1, wherein the injection plunger is made of two parts, defining a rearward part, which is formed by the extruder, and a forward part, which is formed by a transition piece which is connected to the extruder and movable in the housing.

3. The plasticizing and injection unit of claim 1, wherein the injection plunger is of single-piece construction and has a leading part movable in the housing and a trailing part configured to provide a barrel for accommodating the plasticizing screw of the extruder.

4. The plasticizing and injection unit of claim 1, wherein the extruder is constructed in the form of a single screw extruder including a barrel for accommodating the plasticizing screw, wherein the outer thread of the plasticizing screw has a forward area of reduced outer diameter to define the passageway.

5. The plasticizing and injection unit of claim 1, wherein the extruder is a twin screw extruder having two of said plasticizing screw for rotation in opposite direction and a barrel for accommodating the plasticizing screws, defined by an outer diameter, said plasticizing screws having an area of reduced outer diameter to define the passageway.

6. The plasticizing and injection unit of claim 1, wherein the valve is en actively controllable shutoff valve.

7. The plasticizing and injection unit of claim 1, wherein the plasticizing screw is solid.

8. The plasticizing and injection unit of claim 1, wherein the extruder is constructed in the form of a single screw extruder including a barrel, which barrel is defined by a cylinder diameter and accommodates the plasticizing screw, said barrel having an area of increased cylinder diameter to define the passageway.

9. The plasticizing and injection unit of claim 1, wherein the extruder is constructed in the form of a single strew extruder including a barrel for accommodating the plasticizing screw, said plasticizing screw having screw lands formed with holes to define the passageway in a forwardmost area of the plasticizing screw.

10. The plasticizing and injection unit of claim 1, wherein the extruder is a twin screw extruder having two of said plasticizing screw for rotation in opposite direction and a barrel, which barrel is defined by a cylinder diameter and accommodates the plasticizing screws, said barrel having an area of increased cylinder diameter to define the passageway.

11. The plasticizing and injection unit of claim 1, wherein the extruder is a twin screw extruder having two of said plasticizing screw for rotation in opposite direction and a barrel for accommodating the plasticizing screws, said plasticizing screws having screw lands formed with holes to define the passageway in a forwardmost area of the plasticizing screw.

12. The plasticizing and injection unit of claim 1, wherein the extruder is a twin screw extruder with two of said plasticizing screw for rotation in a same direction, said passageway being formed between the two plasticizing screws.

13. A combined plasticizing and injection unit for an injection molding machine, comprising:
   a housing;
   an injection nozzle supported by the housing for interaction with an injection mold;
   a twin screw extruder constructed for continuously producing melt and for forcing melt into the injection mold via the injection nozzle, said extruder including an injection plunger supported for movement in a telescopic manner in the housing and defining with the housing anteriorly of the injection plunger an injection space for supply of melt to the injection nozzle, said injection plunger configured to define a barrel and including a melt through channel for feeding the injection space with melt, said extruder including two plasticizing screws which are received in the barrel and continuously rotate in a same direction for constantly producing melt; and
   a valve disposed in the melt through channel and controllable to close the melt through channel
   wherein the extruder defines a passageway between the two plasticizing screws to enable melt to backup towards the rear of the plasticizing screw, when the melt through channel is closed by the valve and melt is injected into the injection mold by the injection plunger of the extruder.

14. The plasticizing and injection unit of claim 13, wherein the plasticizing screws are arranged tangent to one another and do not mesh to thereby define the passageway.

* * * * *